(12) United States Patent
Katsumi (10) Patent No.: US 10,884,107 B2
(45) Date of Patent: Jan. 5, 2021

(54) LASER SCANNING SENSOR

(71) Applicant: OPTEX CO., LTD., Shiga (JP)

(72) Inventor: Keisuke Katsumi, Shiga (JP)

(73) Assignee: OPTEX CO., LTD., Shiga (JP)

( * ) Notice: Subject to any disclaimer, the term of this patent is extended or adjusted under 35 U.S.C. 154(b) by 439 days.

(21) Appl. No.: 15/775,875

(22) PCT Filed: Nov. 16, 2015

(86) PCT No.: PCT/JP2015/082113
§ 371 (c)(1),
(2) Date: May 14, 2018

(87) PCT Pub. No.: WO2017/085762
PCT Pub. Date: May 26, 2017

(65) Prior Publication Data
US 2018/0329039 A1    Nov. 15, 2018

(51) Int. Cl.
*G01S 7/481* (2006.01)
*G08B 13/183* (2006.01)
(Continued)

(52) U.S. Cl.
CPC .......... *G01S 7/4817* (2013.01); *G01S 7/4813* (2013.01); *G01S 17/04* (2020.01); *G01S 17/42* (2013.01);
(Continued)

(58) Field of Classification Search
CPC ... G08B 13/181; G08B 13/183; G08B 13/189
See application file for complete search history.

(56) References Cited

U.S. PATENT DOCUMENTS 5,469,141 A * 11/1995 Ghazarian ........... B60R 25/1004
340/429
6,357,936 B1   3/2002 Elberbaum
(Continued)

FOREIGN PATENT DOCUMENTS

EP    1 113 408    7/2001
EP    1 832 866    9/2007
(Continued)

OTHER PUBLICATIONS

Extended European Search Report dated Jun. 13, 2019 in European Patent Application No. 15908702.2.
(Continued)

*Primary Examiner* — Eric L Bolda
(74) *Attorney, Agent, or Firm* — Wenderoth, Lind & Ponack, L.L.P.

(57) ABSTRACT

A laser scanning sensor (100) includes: a head part (110) having a shape inscribed in a virtual cube, wherein the head part has a wiring hole (122) oriented to an intersection of three mutually orthogonal planes in the cube, and attachment portions (123a-123c) provided one each at inscribed points in the three planes, and wherein the head part is further configured to acquire range information in each measurement direction by containing a laser range finder (111) and a scanning mechanism (112) for changing a measurement direction by the laser range finder (111); a base part (140) configured to be mounted on an installation surface; and a joint part (130) configured to join any one of the attachment portions (123a-123c) in the head part (110) with the base part (140).

16 Claims, 8 Drawing Sheets

(51) Int. Cl.
*G01S 7/48* (2006.01)
*G08B 13/189* (2006.01)
*G01S 17/04* (2020.01)
*G01S 17/42* (2006.01)
*G01S 17/58* (2006.01)

(52) U.S. Cl.
CPC .......... *G08B 13/183* (2013.01); *G01S 7/4808* (2013.01); *G01S 17/58* (2013.01); *G08B 13/189* (2013.01)

(56) References Cited

U.S. PATENT DOCUMENTS

| | | | | |
|---|---|---|---|---|
| 2006/0279867 | A1* | 12/2006 | Deguchi | G01V 8/14 359/896 |
| 2012/0113410 | A1 | 5/2012 | Iwasawa et al. | |
| 2014/0285309 | A1* | 9/2014 | Weidman | G01S 17/86 340/1.1 |

FOREIGN PATENT DOCUMENTS

| | | |
|---|---|---|
| JP | 2531598 | 4/1997 |
| JP | 2011-022080 | 2/2011 |

OTHER PUBLICATIONS

International Search Report dated Dec. 22, 2015 in International (PCT) Application No. PCT/JP2015/082113.

\* cited by examiner

| | Ceiling surface installation | Wall surface installation | |
|---|---|---|---|
| Pattern A | vertical area | horizontal area | factory default (reassembly not required) |
| Pattern B | | front area | reassembly of base cover only |
| Pattern C | horizontal area | area along wall surface (left) | reassembly of base cover only |
| Pattern D | | area along wall surface (right) | reassembly of base cover and wiring cover |

LASER SCANNING SENSOR

TECHNICAL FIELD

The present invention relates to a laser scanning sensor, for example, for detecting an intruder or the like on the building's premises, and particularly relates to a laser scanning sensor which can be installed on whichever of a ceiling surface and a wall surface and which allows greater flexibility in the setting of a detection area or in other respects.

BACKGROUND ART

A laser scanning sensor for detecting an intruder or the like on the building's premises has been proposed by conventional techniques (e.g. see PTL 1).

According to a laser scanning sensor 100 disclosed in PTL 1, a detection area A100 is formed in a fixed direction with respect to a housing 101. In order to change the direction of forming the detection area A100, it is necessary to change the installation location and orientation of the housing 101 in some manner (for example, by using a dedicated attachment member, or otherwise).

As a precondition for precise range measurement, a laser scanning sensor needs to be firmly fixed on an installation surface. Hence, for example, it is inappropriate to hold the laser scanning sensor by a flexible arm or something else.

Although not a laser scanning sensor, it has been also suggested a hot-wire detector which can be fixed on a ceiling surface or a wall surface and which has a slidable sensor unit in order to adjust the extent of the detection area selectively (e.g. see PTL 2).

CITATION LIST

Patent Literature

[PTL 1] JP 2011-022080 A
[PTL 2] JP 2531598 Y2

SUMMARY OF INVENTION

Technical Problem

However, due to safety requirements and other needs for a laser scanning sensor, a main body cover or other like components should not be removed during laser irradiation, even for the purpose of adjusting the detection area. Therefore, the main body should have a structure which cannot be basically disassembled, and the configuration as disclosed in PTL 2 is not applicable.

In view of the above-mentioned problem in conventional techniques, the present invention aims to provide a laser scanning sensor which can be installed on whichever of a ceiling surface and a wall surface and which allows greater flexibility in the setting of a detection area or in other respects.

Solution to Problem

In order to achieve the above object, a laser scanning sensor according to the present invention is characterized by including: a head part having a shape inscribed in a virtual cube, wherein the head part has a wiring hole oriented to an intersection of three mutually orthogonal planes in the cube, and attachment portions provided one each at inscribed points in the three planes, and wherein the head part is further configured to acquire range information in each measurement direction by containing a laser range finder and a scanning mechanism for changing a measurement direction by the laser range finder; a base part configured to be mounted on an installation surface; and a joint part configured to join any one of the attachment portions in the head part with the base part.

Preferably, the attachment portions have a common positional relationship to the wiring hole. Provided that the cube is cut off in an equilaterally triangular pyramid shape whose vertex is at the intersection and thereby provides an equilaterally triangular plane, the wiring hole may be positioned, for example, at a center of the equilaterally triangular plane.

The thus configured laser scanning sensor can be firmly installed on whichever of a ceiling surface and a wall surface and enables various installation patterns, thereby allowing remarkable flexibility in the setting of a detection area.

In the laser scanning sensor according to the present invention, the joint part may have, on an inner circumferential surface thereof, an annular fitted portion in a shape of a partially cutaway sphere. The base part may have a fitting portion shaped to fit in the fitted portion. The fitted portion and the fitting portion may be fitted with each other via a resilient member.

The thus configured laser scanning sensor not only enables fine adjustment of the detection area but also allows outdoor use owing to its waterproof property.

In the laser scanning sensor according to the present invention, the attachment portions include a first attachment portion, a second attachment portion, and a third attachment portion. The head part may further have a fourth attachment portion which is positioned symmetrically to the third attachment portion about a line connecting the first attachment portion and the second attachment portion. The orientation of the wiring hole is selectable from an orientation toward the third attachment portion or an orientation toward the fourth attachment portion, relative to the first attachment portion and the second attachment portion.

The thus configured laser scanning sensor can increase the number of possible installation patterns and thereby further enhances flexibility in the setting of a detection area.

Advantageous Effects of Invention

The laser scanning sensor according to the present invention can be firmly installed on whichever of a ceiling surface and a wall surface and enables various installation patterns, thereby allowing remarkable flexibility in the setting of a detection area.

DESCRIPTION OF EMBODIMENTS

Hereinafter, embodiments of the present invention are described with reference to the drawings.

<Schematic Overall Configuration>

Figure 1:
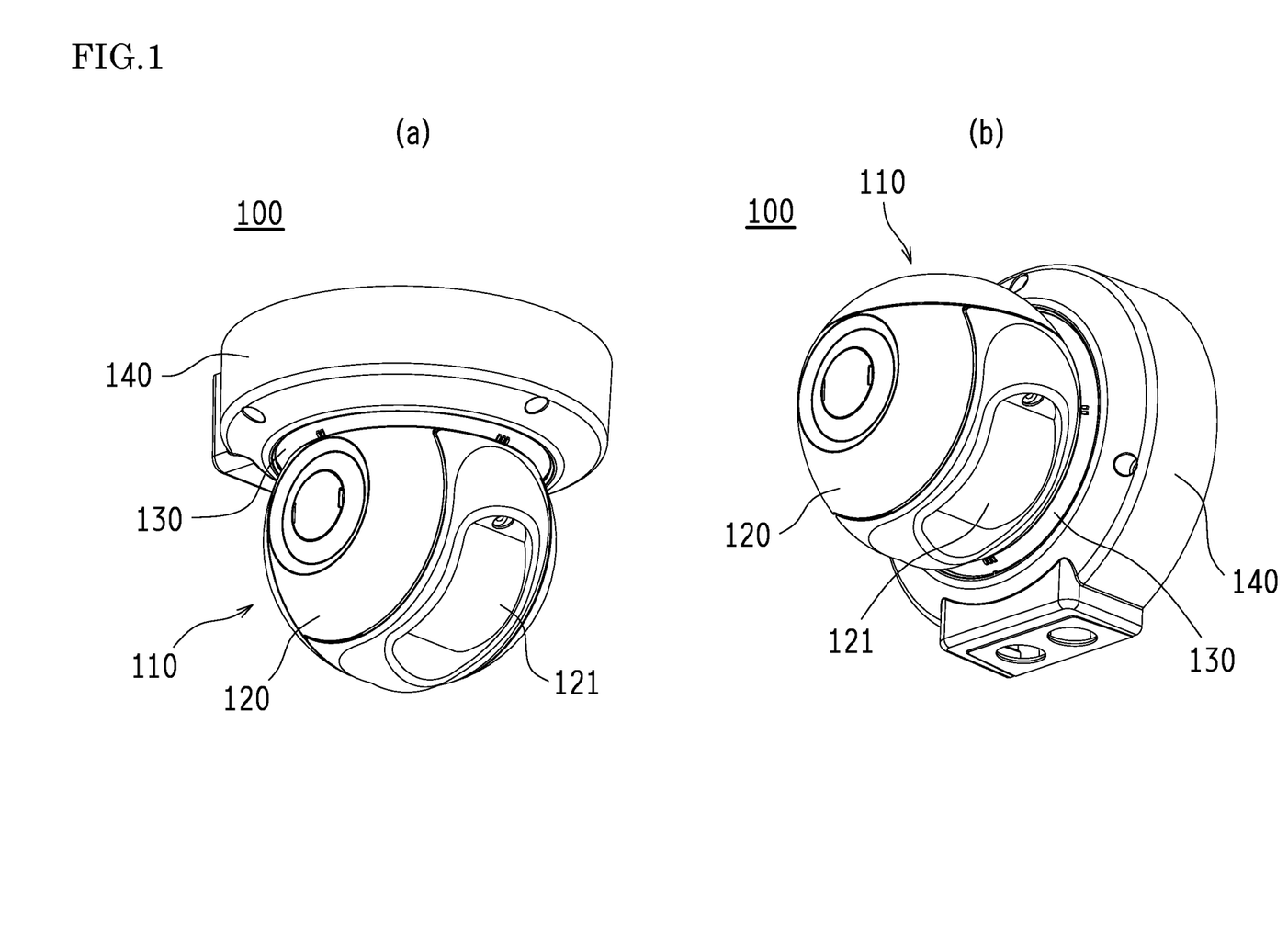
FIG. 1(a) is an external view of a laser scanning sensor 100 to be mounted on a ceiling surface, in an embodiment of the present invention.
FIG. 1(b) is an external view of the laser scanning sensor 100 to be mounted on a wall surface.

FIG. 1(a) is an external view of a laser scanning sensor 100 to be mounted on a ceiling surface, in an embodiment of the present invention. FIG. 1(b) is an external view of the laser scanning sensor 100 to be mounted on a wall surface.

As shown in FIGS. 1(a) and 1(b), the laser scanning sensor 100 has a head part 110 which includes a round housing 120 and a laser window 121 provided in the housing 120, a base part 140 to be mounted on an installation surface such as a ceiling surface or a wall surface, and a joint part 130 for joining the head part 110 and the base part 140.

For example, the laser scanning sensor 100 may be mounted on a ceiling surface as shown in FIG. 1(a) and may form a detection area A100 (to be described later with reference to FIG. 3) below the ceiling surface. Alternatively, the laser scanning sensor 100 may be mounted on a wall surface as shown in FIG. 1(b) and may form a detection area A100 along the wall surface. The structural feature of the laser scanning sensor 100 and details of the joint part 130 will be described later with reference to FIG. 4 and beyond.

Figure 2:
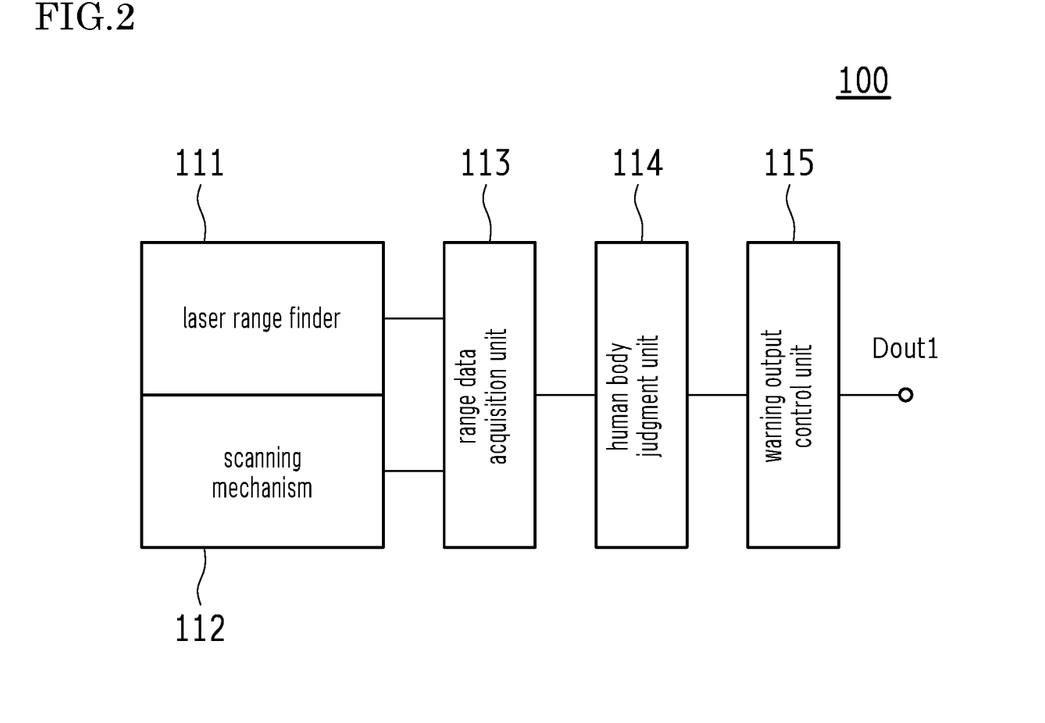
FIG. 2 is a block diagram showing a schematic electric configuration of the laser scanning sensor 100.
Figure 3:
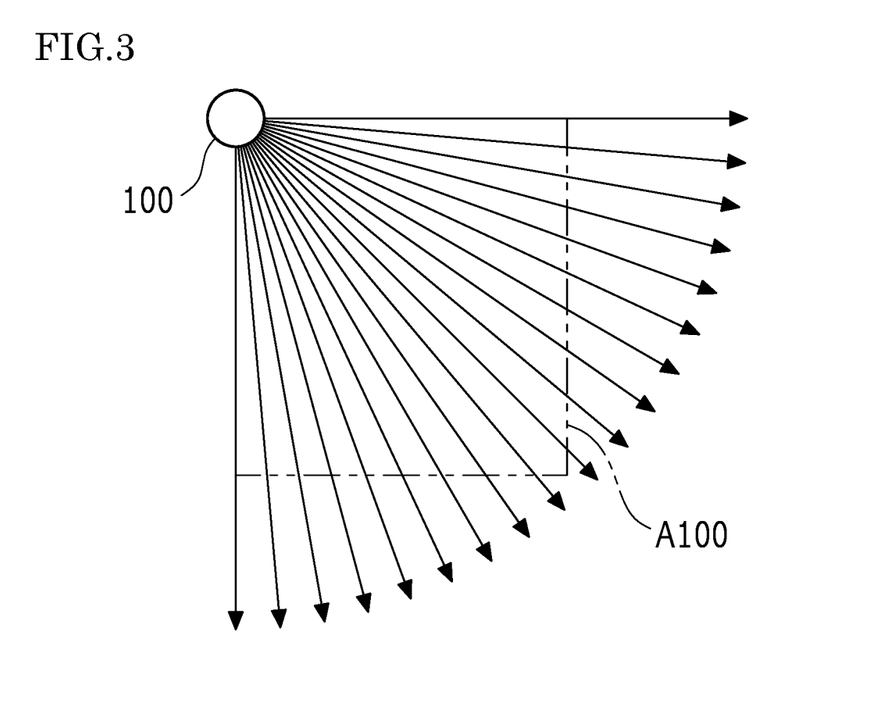
FIG. 3 is a schematic view showing a detection area A100 formed by the laser scanning sensor 100.

FIG. 2 is a block diagram showing a schematic electric configuration of the laser scanning sensor 100. FIG. 3 is a schematic view showing a detection area A100 formed by the laser scanning sensor 100. For convenience of description, intervals of adjacent range measurement directions in FIG. 3 are illustrated on a much greater scale than actual intervals.

As shown in FIG. 2, the laser scanning sensor 100 includes a laser range finder 111, a scanning mechanism 112, a range data acquisition unit 113, a human body judgment unit 114, and a warning output control unit 115, all of which are housed in the head part 110.

The laser range finder 111 emits a pulse laser beam, measures a brief period of time until the beam is reflected back by an object present in the direction of the emitted beam, and thereby accurately measures a range to the object. In the laser range finder 111, a light-emitting element for the laser beam may be, for example, a semiconductor laser diode (LD) or the like, and the light-receiving element may be, for example, an avalanche photodiode (APD) or the like. For drive control of the light-emitting element and measurement of return time of the reflected beam, it is desirable to provide dedicated hardware circuits or the like. As general characteristics, the laser range finder can accurately measure the range up to a considerably long distance, for example, up to several tens of meters at the maximum, and even farther in some cases. Having said that, a maximum detection range may be set as the upper limit.

The scanning mechanism 112 is rotatable by means of a built-in motor or the like (not shown) and is mechanically connected to at least a part of the laser range finder 111 so as to be able to change the direction (angle) of range measurement by the laser range finder 111. For example, the scanning mechanism 112 may be connected to rotate only the optical system of the laser range finder 111 or to rotate the whole of the laser range finder 111, or may be configured otherwise. When the scanning mechanism 112 rotates at a constant speed in a predetermined direction, the direction of range measurement by the laser range finder 111 changes in coordination.

While the laser range finder 111 repeats periodic measurements, with the measurement direction being changed by the scanning mechanism 112, the range data acquisition unit 113 forms a detection area A100 as shown in FIG. 3 and sequentially acquires range data in the detection area A100 at a predetermined time interval, in each of the measurement directions spaced by a predetermined angle.

The human body judgment unit 114 first analyzes the range data acquired by the range data acquisition unit 113 and then extracts a portion of the range data that is presumed to indicate a human body shape.

Since the range data is acquired sequentially by the range data acquisition unit 113, the human body judgment unit 114 monitors the state of travel as to how the portion of the range data that has been judged possibly as a human body is changing in subsequent range data. Similarly, if the trace of movement is notably discontinuous, the object is highly unlikely to be a human. By considering the direction of travel or other additional factors, it is also possible to determine whether the object is an intruder to watch out for, or a pedestrian merely walking near the border of the detection area A100. Finally, taking all these and other judgments into consideration, the human body judgment unit 114 judges the presence/absence of a human body to watch out for.

The warning output control unit 115 outputs a warning signal Dout1 if the human body judgment unit 114 acknowledges the presence of a human body.

The range data acquisition unit 113, the human body judgment unit 114, the warning output control unit 115, and the like are preferably configured by, for example, a built-in one-chip microcomputer or an FPGA (Field Programmable Gate Array), and software processing thereof. The determination processes as mentioned above can be carried out by pattern matching and other like techniques, which permits use of a relatively inexpensive one-chip microcomputer and thereby contributes to cost reduction for the laser scanning sensor 100 as a whole. Having said that, use of a one-chip microcomputer is not necessarily essential.

<Characteristic Arrangements of the Components>

Figure 4:
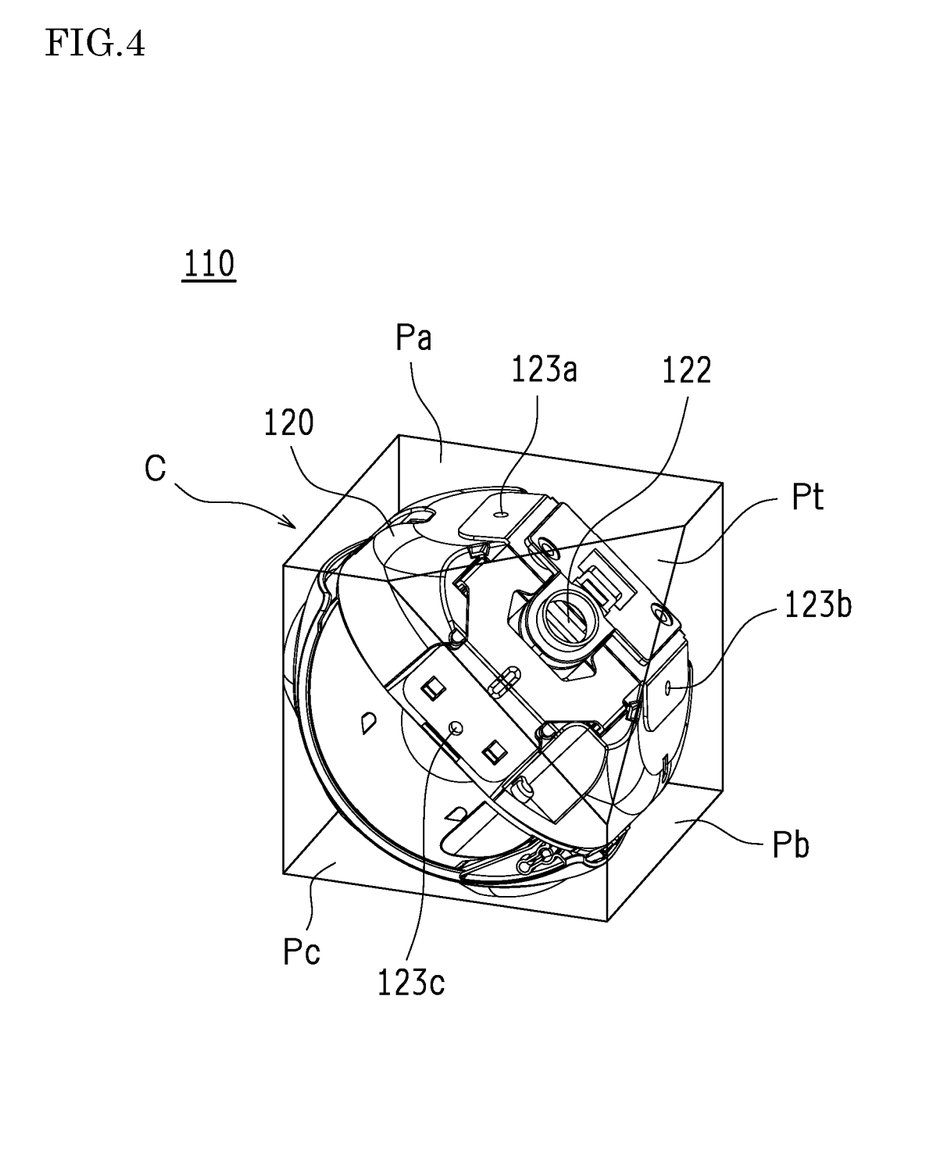
FIG. 4 is a schematic perspective view showing a structural feature of a head part 110 in the laser scanning sensor 100, as viewed from a side opposite to a laser window 121.
Figure 5:
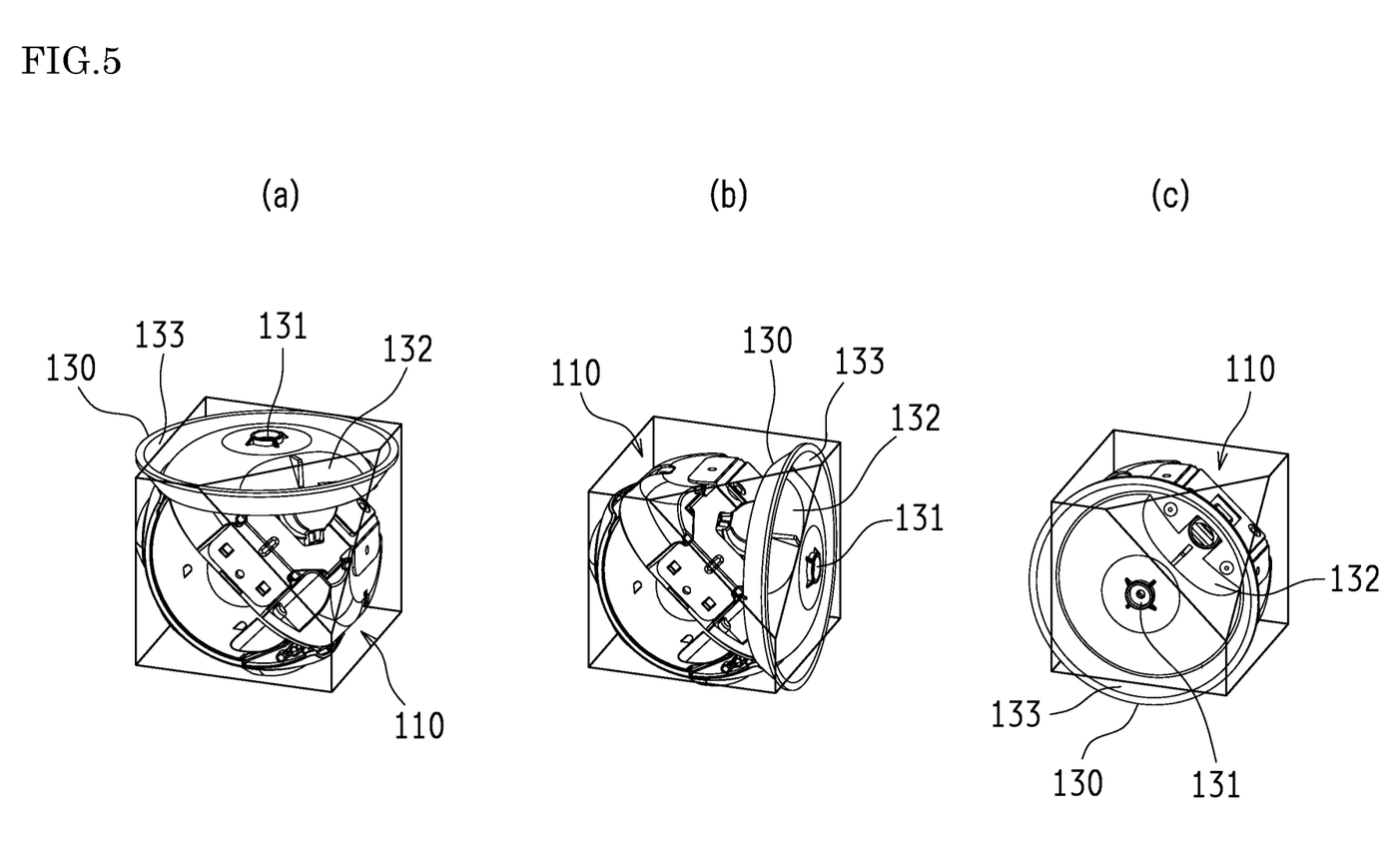
FIGS. 5(a)-5(c) are schematic perspective views showing three modes for joining the head part 110 and the joint part 130.

FIG. 4 is a schematic perspective view showing a structural feature of the head part 110 in the laser scanning sensor 100, as viewed from a side opposite to the laser window 121. FIGS. 5(a)-5(c) are schematic perspective views showing three modes for joining the head part 110 and the joint part 130. In these drawings, a side cover and any other component which covers the surface of the head part 110 are removed.

As shown in FIG. 4, the head part 110 of the laser scanning sensor 100, as a whole, has a shape inscribed in a virtual cube C.

The head part 110 has a wiring hole 122 through which a wire is drawn out of the head part 110 and which is oriented to the intersection of three mutually orthogonal planes Pa, Pb, Pc in the cube C. To be more specific, provided that a corner of the cube C (the intersection of the three planes Pa, Pb, Pc) is cut off in an equilaterally triangular pyramid shape to provide a plane Pt (an equilaterally triangular plane), the wiring hole 122 is positioned at the center of the plane Pt.

The head part 110 also has attachment portions 123a-123c, at which the joint part 130 may be mounted, at inscribed points where the head part 110 is in contact with the three planes Pa, Pb, Pc, respectively. The attachment portions 123a-123c have a common positional relationship to the wiring hole 122. Each of the attachment portions 123a-123c may be composed of, for example, a single screw hole as illustrated in FIG. 4, or may be composed of two or more screw holes or an attachment structure other than a screw hole.

As shown in FIGS. 5(a)-5(c), the joint part 130 is mounted on any of the attachment portions 123a-123c of the head part 110. Since the attachment portions 123a-123c have a common positional relationship to the wiring hole 122 as mentioned above, the joint part 130 can be attached to any of the attachment portions 123a-123c. The joint part 130 has an annular fitted portion 133 in the shape of a partially cutaway sphere on an inner circumferential surface thereof, and a substantially similar shape on an outer circumferential surface thereof.

For example, the central portion 131 of the joint part 130 is fixedly screwed on the attachment portion 123a, as shown in FIG. 5(a). Alternatively, the central portion 131 may be fixedly screwed on the attachment portion 123b as shown in FIG. 5(b) or on the attachment portion 123c as shown in FIG. 5(c).

In any of these cases, an opening 132 formed in a part of the inner side of the joint part 130 is oriented to the wiring hole 122 of the head part 110, so that a wire drawn out through the wiring hole 122 can be led through the opening 132 in the totally same manner.

Figure 6:
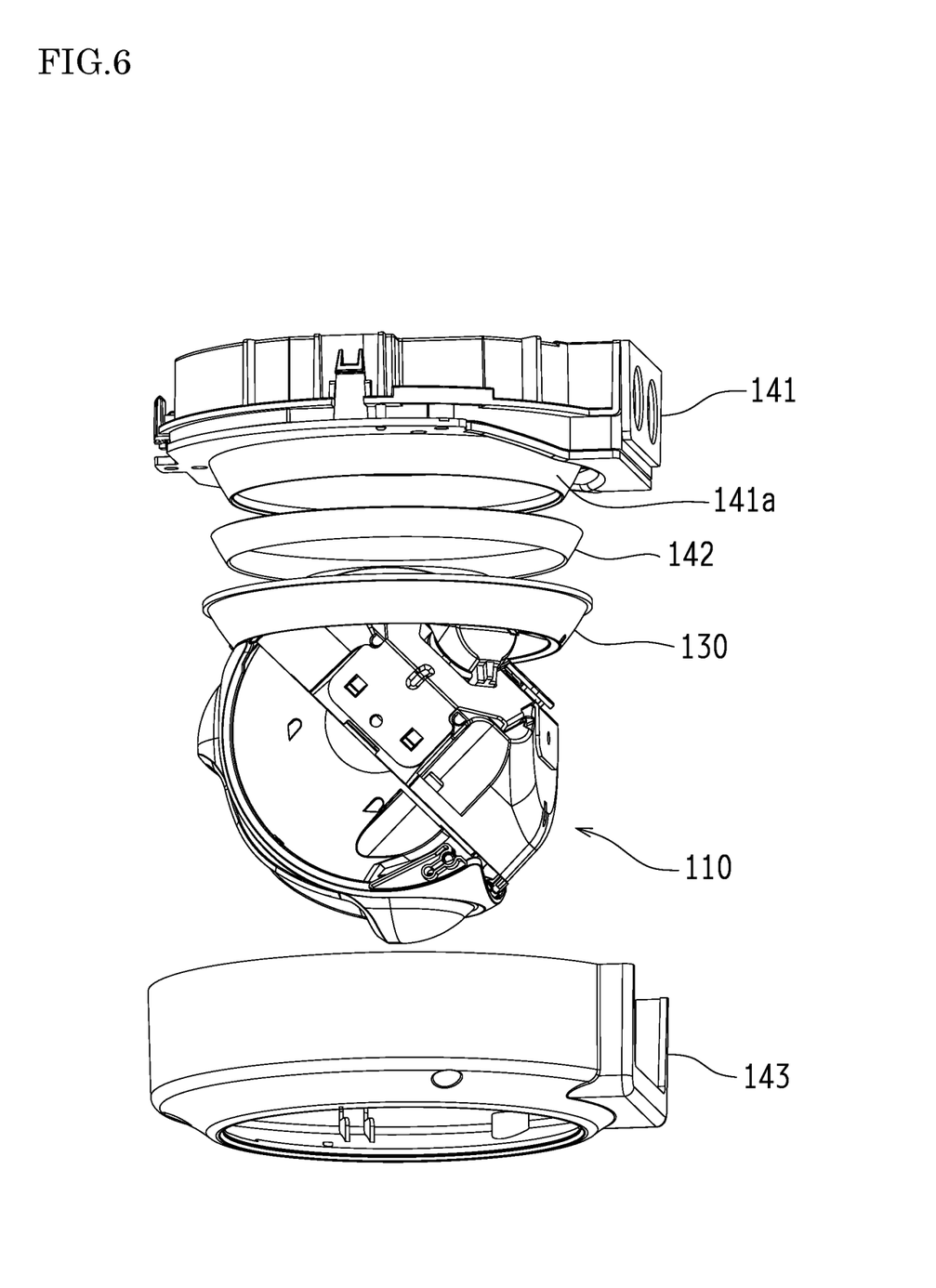
FIG. 6 is an exploded view of the laser scanning sensor 100.

FIG. 6 is an exploded view of the laser scanning sensor 100. Also in this drawing, a side cover and any other component which covers the surface of the head part 110 are removed.

As shown in FIG. 6, the base part 140 of the laser scanning sensor 100 includes a base 141 to be actually mounted on the installation surface, a rubber ring 142 inserted between the base 141 and the joint part 130, and a base cover 143 configured to press and hold the joint part 130 fixedly against the base part 140.

The base 141 has a fitting portion 141a shaped to fit in the fitted portion 133 of the joint part 130, on an opposite side to the installation surface (a side on which the head part 110 is connected).

The rubber ring 142 has a size and a shape to be in tight contact with the fitting portion 141a of the base 141 and the fitted portion 133 of the joint part 130. The rubber ring 142 simply needs to be a waterproof resilient member, and is not necessarily limited to a rubber component.

When the fitting portion 141a of the base 141 and the fitted portion 133 of the joint part 130 are fitted with each other via the rubber ring 142, the rubber ring 142 not only imparts an antislip function and a waterproof function but also enables sliding movement for fine adjustment of, for example, the direction of the detection area A100.

The first step for installation of the laser scanning sensor 100 is to fix the base 141 on an installation surface such as a ceiling surface or a wall surface. The base 141 may be directly fixed on the installation surface or may be mounted via an attachment fitting or the like. In the latter case, for example, an attachment fitting is securely fixed in advance on the installation surface by a screw or the like, and then the base 141 is joined with the attachment fitting.

The central portion 131 of the joint part 130 is securely screwed on any of the attachment portions 123a-123c of the head part 110.

Next, the inner circumferential surface of the joint part 130 is fitted on the base 141, with the rubber ring 142 interposed therebetween. Then, the base cover 143 is applied thereon and firmly fixed by a screw or the like. Where necessary, the screw may be left slightly loose so as to allow some movement of the head part 110 for fine adjustment of the direction of the detection area A100 or the like, and thereafter the head part 110 may be fixed firmly.

<Various Installation Patterns>

Figure 7:
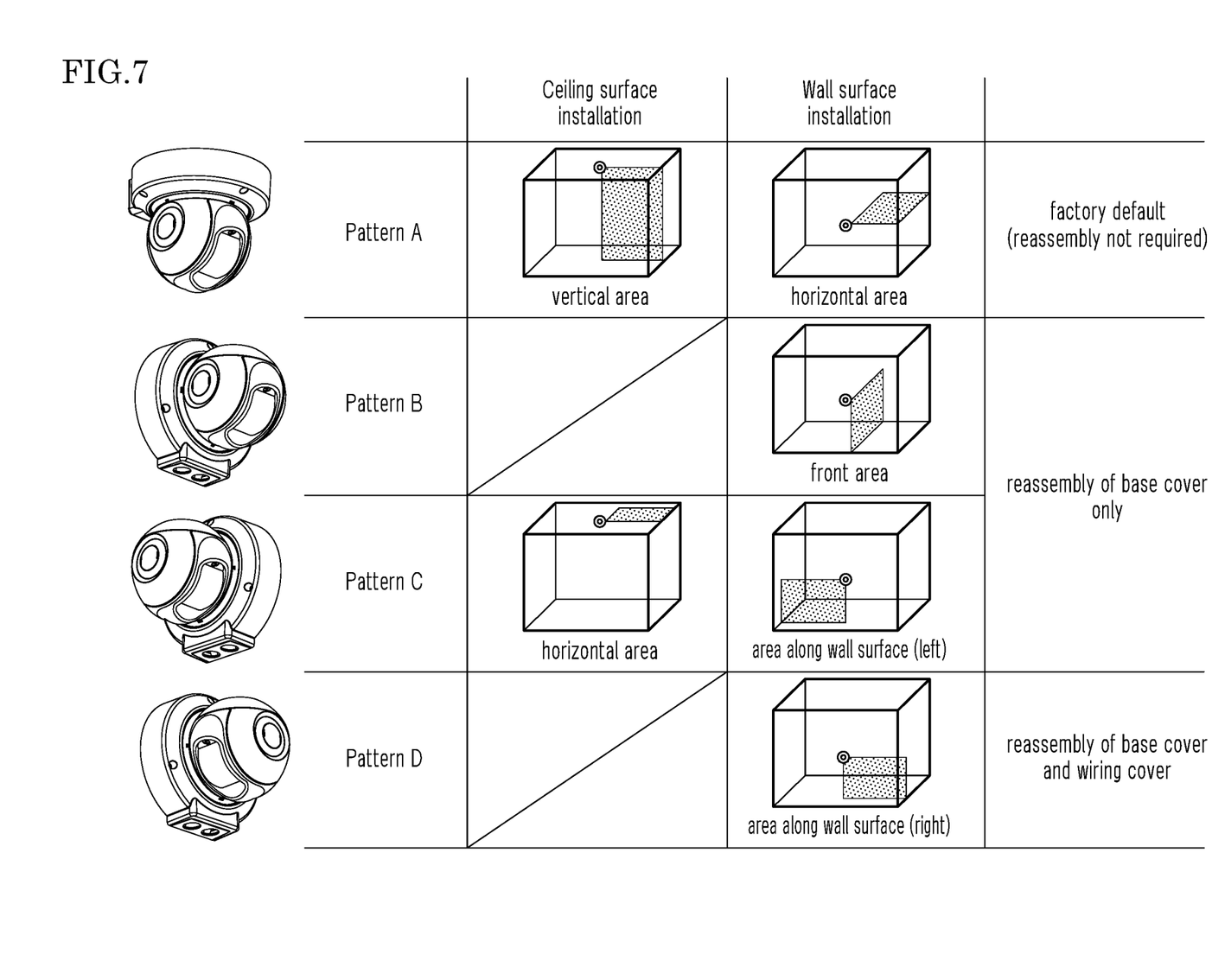
FIG. 7 is a list of various installation patterns of the laser scanning sensor 100.

FIG. 7 is a list of various installation patterns of the laser scanning sensor 100. In this list, the cubes, black dots, and hatched zones schematically represent installation spaces (e.g. rooms), laser scanning sensors 100, and detection areas A100, respectively. FIGS. 8(a)-8(e) are views for explaining a reassembly procedure from Pattern A (factory default) to Pattern B or C. FIGS. 9(a)-9(d) are views for explaining a reassembly procedure to Pattern D. In FIGS. 8(a)-8(e) and 9(a)-9(d), a side cover and any other component which covers the surface of the head part 110 are removed, and the base part 140 is omitted.

As shown in FIG. 7, the laser scanning sensor 100 can provide three installation patterns, depending on the combinations of the attachment portions 123a-123c of the head part 110 with the joint part 130. An additional installation pattern is also available according to an arrangement to be described later with reference to FIGS. 9(a)-9(d).

For example, in the factory default configuration, the joint part 130 may be attached to the attachment portion 123a of the head part 110 (Pattern A). In this case, the laser scanning sensor 100 installed on a ceiling surface can form a detection area A100 vertically downwardly from the ceiling surface, and the laser scanning sensor 100 installed on a wall surface can form a detection area A100 horizontally at the installed height.

In order to install the laser scanning sensor 100 on a wall surface and to form a detection area A100 vertically downwardly from the front, the joint part 130 needs to be re-attached to the attachment portion 123b of the head part 110 (Pattern B).

Figure 8:
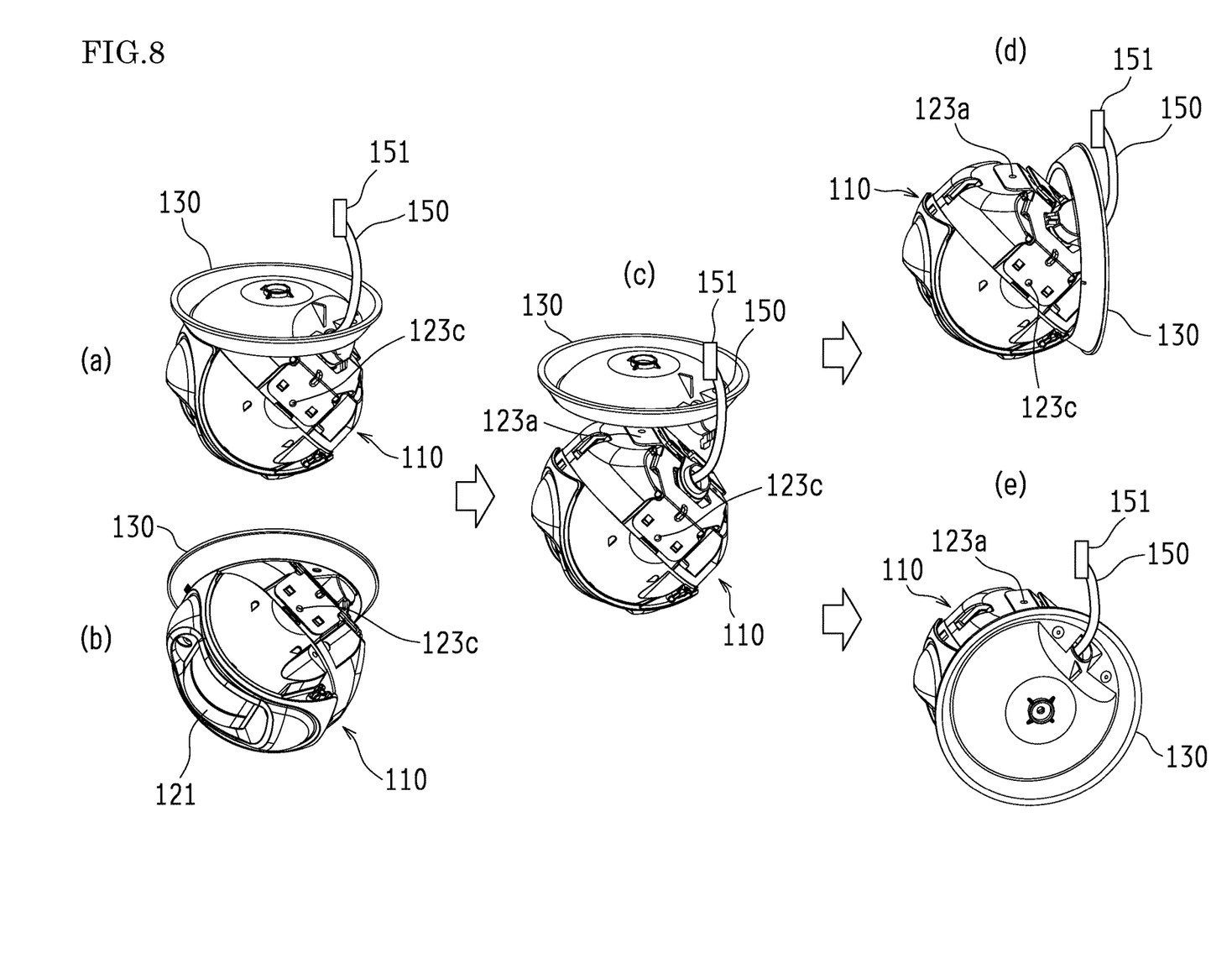
FIGS. 8(a)-8(e) are views for explaining a reassembly procedure from Pattern A (factory default) to Pattern B or C.

In the factory default configuration, the joint part 130 is attached to the attachment portion 123a of the head part 110 as shown in FIGS. 8(a) and 8(b). From this configuration, the joint part 130 is detached as shown in FIG. 8(c), and then attached to the attachment portion 123b as shown in FIG. 8(d), paying attention to a wire 150 which connects the connector 151 and the head part 110.

In order to install the laser scanning sensor 100 on a ceiling surface and to form a detection area A100 horizontally along the ceiling surface, or in order to install the laser scanning sensor 100 on a wall surface and to form a detection area A100 downwardly on the left along the wall surface, the joint part 130 needs to be re-attached to the attachment portion 123c of the head part 110 (Pattern C).

For this purpose, the joint part 130 is detached as shown in FIG. 8(c), and then attached to the attachment portion 123c as shown in FIG. 8(e).

However, the above-described configurations of the head part 110 cannot form a detection area A100 downwardly on the right along a wall surface by installing the laser scanning sensor 100 on the wall surface (Pattern D).

Figure 9:
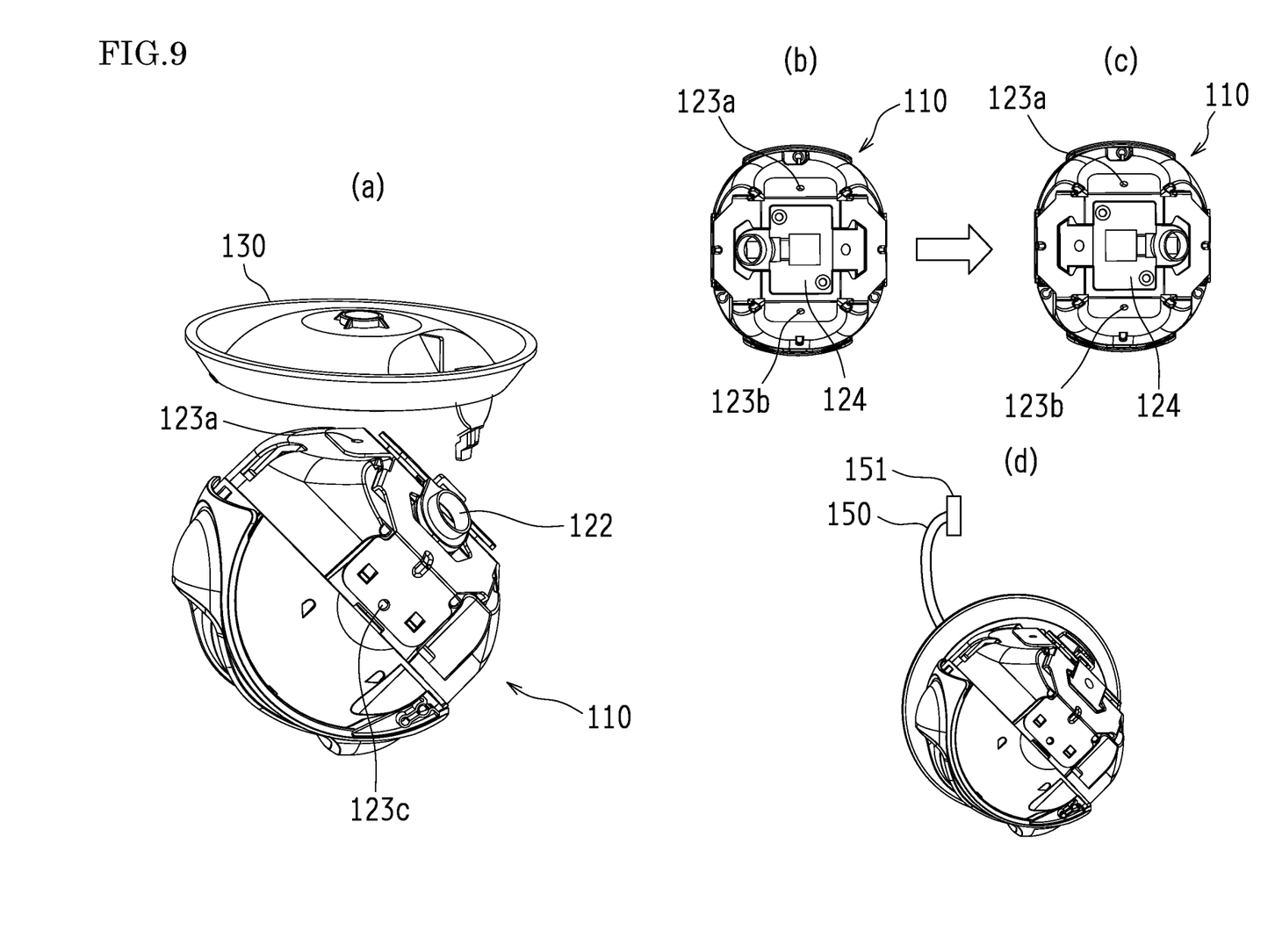
FIGS. 9(a)-9(d) are views for explaining a reassembly procedure to Pattern D.

In this regard, an additional attachment portion may be provided on the surface of the head part 110, symmetrically to the attachment portion 123c about a line connecting the attachment portion 123a and the attachment portion 123b (opposite to the attachment portion 123c shown in FIG. 9(a)).

When the joint part 130 is attached to this additional attachment portion, it is preferable to change the orientation of the wiring hole 122 so as not to impose an unnatural force or the like on the wire 150. For example, as shown in FIGS. 9(b) and 9(c), the wiring hole 122 may be formed in a wiring cover 124 which is attachable to the head part 110 in a laterally inverted manner.

In Patterns A-C, the wiring cover 124 is attached such that the wiring hole 122 is positioned closer to and oriented to the attachment portion 123c, as shown in FIG. 9(b). To change from Patterns A-C to Pattern D, the two screws fixing the wiring cover 124 are removed. Then, the wiring cover 124 is laterally inverted as shown in FIG. 9(c) and is fixed again by the screws.

In this manner, the joint part 130 can be attached to the additional attachment portion opposite to the attachment portion 123c as shown in FIG. 9(d).

The laser scanning sensor according to the configurations of the above-described embodiments can be firmly installed on whichever of a ceiling surface and a wall surface and enables at least six installation patterns in total, thereby allowing remarkable flexibility in the setting of a detection area. Further, owing to its waterproof property, the laser scanning sensor allows not only indoor use but also outdoor use.

The present invention can be embodied and practiced in other different forms without departing from the spirit and essential characteristics of the present invention. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

INDUSTRIAL APPLICABILITY

The present invention is suitable for a laser scanning sensor which detects an intruder or the like on the building's premises, but should not be limited to this application. The present invention is also applicable to other security sensors or the like in which the direction of forming a detection area is restricted.

REFERENCE SIGNS LIST 100 laser scanning sensor
A100 detection area
110 head part
111 laser range finder
112 scanning mechanism
113 range data acquisition unit
114 human body judgment unit
115 warning output control unit
120 housing
121 laser window
122 wiring hole
123a attachment portion
123b attachment portion
123c attachment portion
130 joint part
131 central portion
132 opening
133 fitted portion
140 base part
141 base
141a fitting portion
142 rubber ring
143 base cover
150 wire
151 connector

The invention claimed is:

1. A laser scanning sensor comprising:
a head part having a shape inscribed in a virtual cube, wherein the head part has a wiring hole oriented to an intersection of three mutually orthogonal planes in the cube, and attachment portions provided one each at inscribed points in the three planes, and wherein the head part is further configured to acquire range information in each measurement direction by containing a laser range finder and a scanning mechanism for changing a measurement direction by the laser range finder;
a base part configured to be mounted on an installation surface; and
a joint part configured to join any one of the attachment portions in the head part with the base part.

2. The laser scanning sensor according to claim 1, wherein the attachment portions have a common positional relationship to the wiring hole.

3. The laser scanning sensor according to claim 1, wherein, provided that the cube is cut off in an equilaterally triangular pyramid shape whose vertex is at the intersection and thereby provides an equilaterally triangular plane, the wiring hole is positioned at a center of the equilaterally triangular plane.

4. The laser scanning sensor according to claim 1, wherein the joint part has, on an inner circumferential surface thereof, an annular fitted portion in a shape of a partially cutaway sphere,
wherein the base part has a fitting portion shaped to fit in the fitted portion, and
wherein the fitted portion and the fitting portion are fitted with each other via a resilient member.

5. The laser scanning sensor according to claim 1, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

6. The laser scanning sensor according to claim 2, wherein, provided that the cube is cut off in an equilaterally triangular pyramid shape whose vertex is at the intersection and thereby provides an equilaterally triangular plane, the wiring hole is positioned at a center of the equilaterally triangular plane.

7. The laser scanning sensor according to claim 2, wherein the joint part has, on an inner circumferential surface thereof, an annular fitted portion in a shape of a partially cutaway sphere,
wherein the base part has a fitting portion shaped to fit in the fitted portion, and
wherein the fitted portion and the fitting portion are fitted with each other via a resilient member.

8. The laser scanning sensor according to claim 3, wherein the joint part has, on an inner circumferential surface thereof, an annular fitted portion in a shape of a partially cutaway sphere,
wherein the base part has a fitting portion shaped to fit in the fitted portion, and wherein the fitted portion and the fitting portion are fitted with each other via a resilient member.

9. The laser scanning sensor according to claim 6, wherein the joint part has, on an inner circumferential surface thereof, an annular fitted portion in a shape of a partially cutaway sphere,
wherein the base part has a fitting portion shaped to fit in the fitted portion, and
wherein the fitted portion and the fitting portion are fitted with each other via a resilient member.

10. The laser scanning sensor according to claim 2, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

11. The laser scanning sensor according to claim 3, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

12. The laser scanning sensor according to claim 4, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

13. The laser scanning sensor according to claim 6, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

14. The laser scanning sensor according to claim 7, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

15. The laser scanning sensor according to claim 8, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

16. The laser scanning sensor according to claim 9, wherein the attachment portions comprise a first attachment portion, a second attachment portion, and a third attachment portion,
wherein the head part further has a fourth attachment portion which is positioned symmetrically to the third attachment portion about a line connecting the first attachment portion and the second attachment portion, and
wherein an orientation of the wiring hole is selectable from an orientation toward the third attachment portion or an orientation toward the fourth attachment portion, relative to the first attachment portion and the second attachment portion.

\* \* \* \* \*